United States Patent [19]

Feintuch

[11] Patent Number: 4,654,835
[45] Date of Patent: Mar. 31, 1987

[54] ADAPTIVE PREDICTOR OF SURFACE REVERBERATION IN A BISTATIC SONAR

[75] Inventor: Paul L. Feintuch, Covina, Calif.

[73] Assignee: Hughes Aircraft Company, Los Angeles, Calif.

[21] Appl. No.: 632,769

[22] Filed: Jul. 20, 1984

[51] Int. Cl.[4] ............................................. G01S 9/68
[52] U.S. Cl. .................................. 367/100; 367/95; 367/117; 367/93
[58] Field of Search ............... 367/87, 90, 95, 97–100, 367/117, 93, 94, 135

[56] References Cited

U.S. PATENT DOCUMENTS

| | | | |
|---|---|---|---|
| 3,642,999 | 2/1972 | Murphree | 434/7 |
| 4,207,624 | 6/1980 | Dentino et al. | 367/135 |
| 4,228,517 | 10/1980 | Constant | 364/724 |
| 4,316,269 | 2/1982 | Van't Hullenaar | 367/90 |
| 4,345,252 | 8/1982 | Carre et al. | 342/91 |
| 4,349,897 | 9/1982 | Boehme et al. | 367/98 |
| 4,388,711 | 6/1983 | Fay | 367/135 |

OTHER PUBLICATIONS

Widrow et al, "Adaptive Noise Cancelling: Principles and Applications", Proceedings of the IEEE, vol. 63, No. 12, Dec. 1975, pp. 1692–1716.
F. A. Reed, P. L. Feintuch, and N. J. Berchad, "Time Delay Estimation Using the LMS Adaptive Filter—Static Behavior" (Jun. 1981), pp. 561–571.
B. Widrow, "Adaptive Antenna Systems" (Dec. 1967), pp. 2143–2159.
B. Widrow, "Aspects of Network and System Theory" (1971), pp. 563–587.
S. P. Applebaum, "Adaptive Arrays" (Aug. 1966), (Revised Mar. 1975) (3–75).
"Analysis of the Frequency Domain Adaptive Filter"; Proceeding of the IEEE, vol. 67, Dec. 1979; pp. 1658–1659.

Primary Examiner—Thomas H. Tarcza
Assistant Examiner—Daniel T. Pihulic
Attorney, Agent, or Firm—Robert Thompson; A. W. Karambelas

[57] ABSTRACT

A bistatic sonar employing LMS adaptive spatial prediction is used to process against surface reverberation from the convergence zone (CZ). Hydrophones spatially separated from the primary array are used as references. The critical behavior exploited by the invention is that since the reverberation may be viewed as an extended source for the reverberation, the correlation drops off with separation between the reference and primary sensors, while it stays a constant for the plane wave target return. The reverberation is non-stationary, functionally dependent on the signal (even though the back scatter is statistically uncorrelated with the signal), and spatially extended over the sector of the CZ annulus cut out by the transmitter azimuth beamwidth. The detection of the target is based on the sudden appearance of one strong target point source within a densely packed region of weak point sources that have been constantly present and whose sum is much larger than the target. The use of more than a single reference leads to a minimal improvement in detection performance and may actually degrade performance due to increased algorithm noise. Detection performance tends to increase with increasing separation distance between the primary and the reference hydrophone. For signal, reverberation, and algorithm parameters consistent with modern active sonars operating in the CZ mode, the spatial prediction approach to detection of the plane wave signal will allow detection of targets not possible using conventional active processing, provided the reference hydrophone can be placed to give a correlation of less than 0.05. Such values may be obtained with very reasonable spacing between primary and reference, allowing the reference to be positioned, for example, along the hull aft of the primary array.

13 Claims, 14 Drawing Figures

ADAPTIVE PREDICTOR OF SURFACE REVERBERATION IN A BISTATIC SONAR

TECHNICAL FIELD

This invention relates to a sonar which filters the noise resulting from surface reverberation.

BACKGROUND OF THE INVENTION

This invention is a further advance pertaining to the processing of sea surface reverberation noise from the return signal of a bistatic or multistatic sonar.

Convergence zones are created by the refractive properties of the ocean. The refracted sound rays from an active transmission are reflected from the sea surface causing surface reverberation which, for a first convergence zone, can be nominally located at a range of about thirty miles from the sonar transmission source, have a two-mile width and be thought of as an extended interference source in horizontal and vertical angles made up of a multitude of spatially uncorrelated reflections.

When the surface reverberation noise signal returns along the side lobes, or the main lobe of the sonar signal, the target signal from a low doppler, submerged target located within the convergence zone is virtually indistinguishable from the surface reverberation noise signal located above it. Consequently, detection of the target by conventional sonars is virtually impossible.

Conventional beamforming with an array of hydrophones may be inadequate because the sea surface reverberation interference is sufficiently strong to limit detection even though it appears in the side lobes of the array response or because it appears close enough to the signal that it falls in the main lobe of the array response.

Heretofore, optimal (or adaptive) array processing with any of a number of optimality criteria has been suggested to reject interfering plane waves. An algorithm often implemented in practice to reject such interference has been the Least Mean Square (hereinafter also referred to as "LMS") interference canceller. A beam is steered in the direction of interest using all hydrophones but one which is used as a reference hydrophone. The output of the reference hydrophone is passed through a finite impulse response filter with adaptive coefficients and the filter output subtracted from the beam output. The finite impulse response coefficients are updated using the LMS algorithm to minimize the mean square value of the difference. That is, the beam output serves as the primary input and the reference hydrophone signal as the input to a LMS adaptive noise canceller. When the plane wave interference is much stronger than the background noise and the sonar target signal, this approach provides effective rejection of the interference.

However, in some sonar applications, the interference, though highly directional, cannot be modeled as one or more discrete plane wave fronts but is actually continuous over some finite but narrow region. Consequently, if a single reference hydrophone is used, only a single null is generated which cannot completely suppress the extended interference source, particularly, if the interference source extent is large compared to the width of the null. Thus, as additional reference hydrophones are added to the LMS canceller structure, more nulls can be directed toward the interference improving the cancellation but never completely cancelling the interference. However, as the nulls become closely spaced over the interference extent, additional reference hydrophones will not improve cancellation significantly. Thus, since each additional reference is costly in terms of computations in the adaptive algorithm, there is a tradeoff between computational cost and cancellation performance. Moreover, since algorithm noise is proportional to the number of references, a small improvement in cancellation resulting from the addition of references may actually be offset by the increased algorithm noise. Furthermore, when the target is located within the surface reverberation extent, the target signal as well as the interference will be suppressed, thus making it very difficult to detect such a target.

It is therefore an object of the present invention to provide an active sonar system adapted to detect the presence of a low doppler target located within the convergence zone of the sonar in the presence of surface reverberation noise.

Another object of the invention is to provide a bistatic sonar system adapted to extract the correlation properties in the "signal present" and "signal absent" cases for the energy received at primary and reference sensors.

A further object of the invention is to provide a bistatic sonar whose reference sensor is spatially separated from the primary sensor a substantial distance, and whose processor is adapted to exploit the different correlation properties of the surface reverberation energy and the target signal received at the primary and reference sensors.

A further object of the invention is to provide a bistatic sonar processor having simplified computational requirements.

Another object of the invention is to provide a sonar processor employing a single reference hydrophone and adaptive filter with a primary array for detecting the presence of a submerged target in the convergence zone.

Yet another object of the invention is to provide a sonar processor employing an adaptive filter canceller structure adapted for signal predictor operation.

SUMMARY OF THE INVENTION

The invention comprises a sonar which is adapted to exploit the differences in the correlation properties of the surface reverberation noise and the signal return from a target. A sonar system is provided which comprises a primary bistatic array and at least one passive reference sensor separated by a spacing sufficient to substantially decorrelate the reverberation energy received at the primary and reference sensors. The sonar system further comprises a sonar signal processor which adapts to extract the correlation properties in the target "signal present" and "signal absent" cases.

The preferred embodiment of the processor comprises an adaptive filter coupled to the output of the reference sensor, a summing means for summing the output of the adaptive filter and the primary array sensor to produce an error signal, and a feedback path for feedback of the error signal to the adaptive filter to adjust the filter coefficients. In the preferred embodiment, the adaptive filter employs a Least Mean Square convergence algorithm.

The predictor output comprises the adaptive filter output. Under normal conditions of surface reverberation in the absence of target signal, very little correlation exists between the energy received at the reference and primary sensors, and the adaptive filter does not respond, i.e., on the average, it passes nothing. The error, or cancelled waveform, is essentially the energy received at the primary sensor alone since there is no correlated energy to cancel, and the filter output is very small. When the signal appears, it represents a correlated component in the energy received at the primary and reference sensors. The Least Mean Square adaptive filter operates to try to pass the component so that it can remove it and thus reduce the power in the error waveform. The filter responds to the signal, causing the filter output to increase and thus allows the signal to be detected.

Other objects, features and improvements are disclosed.

BRIEF DESCRIPTION OF THE DRAWINGS

The various objects, features and advantages of the disclosed invention will be readily appreciated by those skilled in the art from the following detailed disclosure when read in conjunction with the accompanying drawing, wherein.

DETAILED DESCRIPTION OF THE PREFERRED EMBODIMENT

Figure 1:
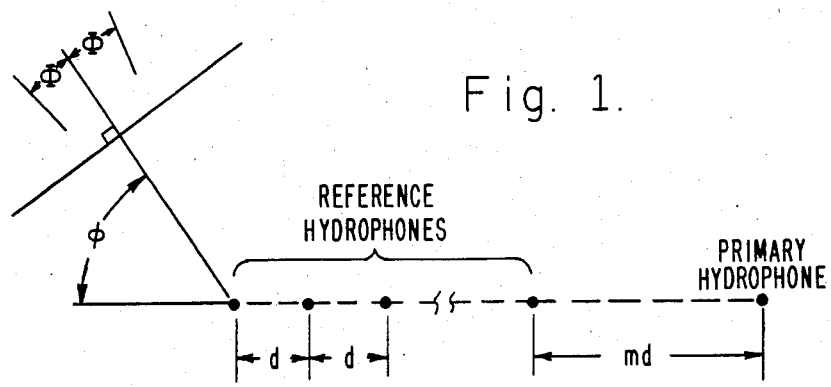
FIG. 1 is an illustration representing the source distribution and array geometry for the far-field extended source model of the surface reverberation.

The present invention comprising a novel bistatic or multistatic sonar adapted to detect targets in the presence of surface reverberation noise. The following description of the invention is provided to enable any person skilled in the art to make and use the invention. Various modifications to the disclosed embodiment will be readily apparent to those skilled in the art, and the generic principles defined herein may be applied to other embodiments. Thus, the present invention is not intended to be limited to the embodiment shown, but is to be accorded the widest scope consistent with the principles and novel features of the invention.

The invention is directed to a technique for processing against surface reverberation from the convergence zone (hereinafter also referred to as "CZ") in an active sonar. When attempting to detect a low doppler, submerged target in the CZ, the backscatter of the transmitted waveform from the surface above the target is usually the limiting source of background noise. The reverberation energy is nonstationary, functionally dependent on the signal (even though the backscatter is statistically uncorrelated with the signal), and spatially extended over the sector of the CZ annulus cut by the transmitter azimuth beamwidth. For typical submarine targets, and at frequencies and power levels of typical surface ship sonars, the signal-to-reverberation ratio can be expected to vary from 0 dB to −20 dB at the beam outputs.

In a basic form, the invention involves bistatic or multistatic operation, wherein one or more reference hydrophones, spatially separated from the primary transmit/receive array of the sonar, are used to suprise the surface reverberation noise in the primary array output. This is accomplished using a Least Mean Square (LMS) adaptive multiple canceller structure configured as an adaptive spatial predictor. In previous work in the open literature, the canceller has been used to suppress point sources of interference in the beamformer output, and in other work by the present inventor, has been applied to the cancellation of the extended source of interference in the CZ. For a target disposed in the same angular region in the primary sonar array beam as the reverberation, the canceller structure will suppress the target signal as well as the reverberation. One aspect of the present invention comprises the modification of such a canceller structure to form a predictor, in order to be able to detect the target which spatially overlays the reverberation.

The critical behavior employed by the invention is that the correlation for the return waveforms of the extended source at the respective sensors drops off with increasing distance between the reference and primary sensors, while it stays a constant for the plane wave target return. The detection of the target is based on one strong target point source within a densely packed region of weak point sources, whose sum is much larger than the target.

FAR-FIELD EXTENDED SOURCE MODEL

For purposes of analysis, several models of the surface reverberation behavior have been developed, and there is some sensitivity to the choice of cross-correlation model. One effective model of the surface reverberation or extended source comprises many independent radiators densely packed over the reflecting surface. Strictly limiting the sonar extent over a small angular region produces a cross-spectral density (hereinafter also referred to as "CSD") whose magnitude varies with hydrophone separation in a sin(x)/x function.

The basic far-field extended source model was developed for the particular sonar array geometry shown in FIG. 1. In this geometry, an integral number N of reference sensors are configured in a uniformly spaced line array and are used to cancel the extended source interference from the output of a primary sensor placed colinear with the reference array.

The extended interference is assumed to be distributed in a plane containing the line array, as shown in FIG. 1. The energy arriving from any angle $\phi_o$, is assumed to produce a plane wave across the entire array. This extended source is assumed to be completely contained in the narrow sector $[\phi_o - \phi, \phi_o + \phi]$ and to have an isotropic ambient noise background. Finally, it is assumed that arrivals from two angles, $\phi_1$ and $\phi_2$, are uncorrelated. This model leads to a Fourier transform relationship between the interference spatial distribution in $\phi$ and the cross-spectral density of the primary and reference hydrophone outputs.

In most cases of interest, the primary sensor will not be a single omni-directional hydrophone but an array of hydrophones steered in some particular direction. Analysis has shown that when the primary array is replaced by a single directional hydrophone, the same statistics for the reference and primary inputs result if:

(a) the single primary hydrophone is placed the same distance from the reference array, (b) the primary hydrophone has the same directional response, $H(\phi)$ as the primary array, and (c) the ambient noise component of the primary hydrophone output has a spectral density given by Equation 1.

$$\sigma_z^2(\omega) = \sum_{n=0}^{N-1} a_n^2 \sigma_n^2(\omega) \tag{1}$$

In Equation 1, $a_n$ is the shading applied to the nth hydrophone and $\sigma_n^2(\omega)$ is the spectral density of the output of a single hydrophone in the primary of the array being replaced. Hence, in the computation of the spectral density of the primary hydrophone output and the cross-spectral density between the primary and the references, the source spatial distribution function is modified by the response of the primary array.

Figure 2A:
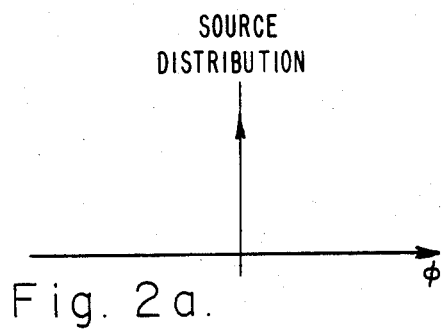
FIGS. 2a-2d are graphs depicting the spatial characterization of an extended source and a point source.

FIG. 2a is a graph illustrating the angular energy distribution of a point source as a function of angular displacement $\phi$ from the primary array centerline. FIG. 2c is a similar plot illustrating the angular distribution resulting from an extended source.

Figure 2B:
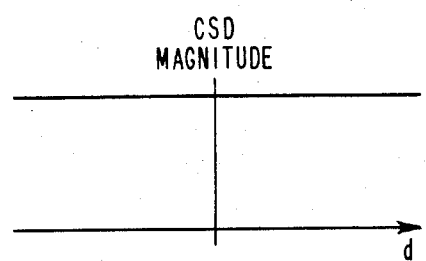
Figure 2C:
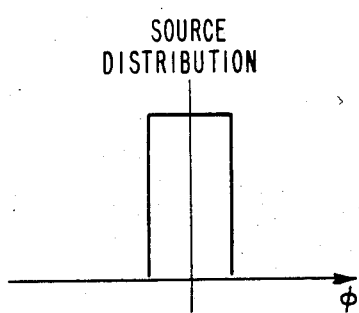
Figure 2D:
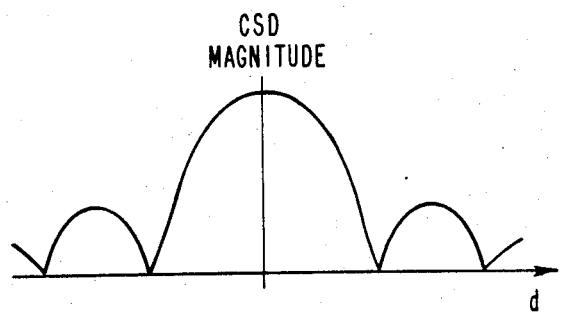

The magnitude of the cross-spectral density between two sensors as a function of sensor spacing d is plotted in FIGS. 2b and 2d for the point source and the extended source, respectively. The CSD function shown for the extended source is the sin(x)/x function developed for the model as discussed above. As the sensors are moved apart, the energy from the extended source tends to become less correlated. The CSD of a point source may be viewed as the cross-correlation at a single frequency between the outputs of two sensors separated by the distance parameter d on the horizontal axis. The magnitude of the CSD for the plane wave signal is a constant with sensor separation, as one would expect for energy from a point source.

BLOCK DIAGRAM OF SONAR PREDICTOR SYSTEM

The present invention exploits these physical properties by extracting the correlation properties of the target "signal present" and "signal absent" cases. There are various alternate configurations to perform this kind of correlation extraction function. Since the signal and the extended source differ in their spatial correlation function, some form of correlator processor will be inherent in all the possible configurations. An implementation employing a correlator would first require bandpass filtering to the bandwidth of a doppler bin in the active sonar, and frequency shifting down to baseband. The square of the magnitude of the time averaged correlator output forms the test statistic. Thus, in the absence of a target return signal, a certain spatial correlation exists between the energy received at the reference hydrophone and the primary array. When the signal appears, this correlation increases, and that difference is used as the test statistic.

A preferred implementation of the predictor system employs an adaptive filter. Among the reasons for using an adaptive filter predictor rather than the correlator implementation outline above is that, in practice, the correlator may be sensitive to certain parameters and conditions assumed to be known, but which are really unknown. For example, the signal portion of the return has unknown arrival time and duration. The correlator needs to be properly gated on and off to take advantage of the signal present intervals, or else its performance degrades.

The adaptive filter on the other hand, learns that the signal is present with a different time constant than its change after the signal turns off. Its gating for synchronization with the target return to detect the target is less sensitive. The adaptive filter is driven by a measured reference waveform and automatically converges to the correct phase shift to provide maximum signal response.

There are other factors, such as target dynamics (which the adaptive filter can track) and unknown reverberation spectra due to the surface spreading (which the adaptive filter automatically estimates and pre-whitens). All of these considerations tend to weigh in favor of the adaptive filter implementation.

Figure 3:
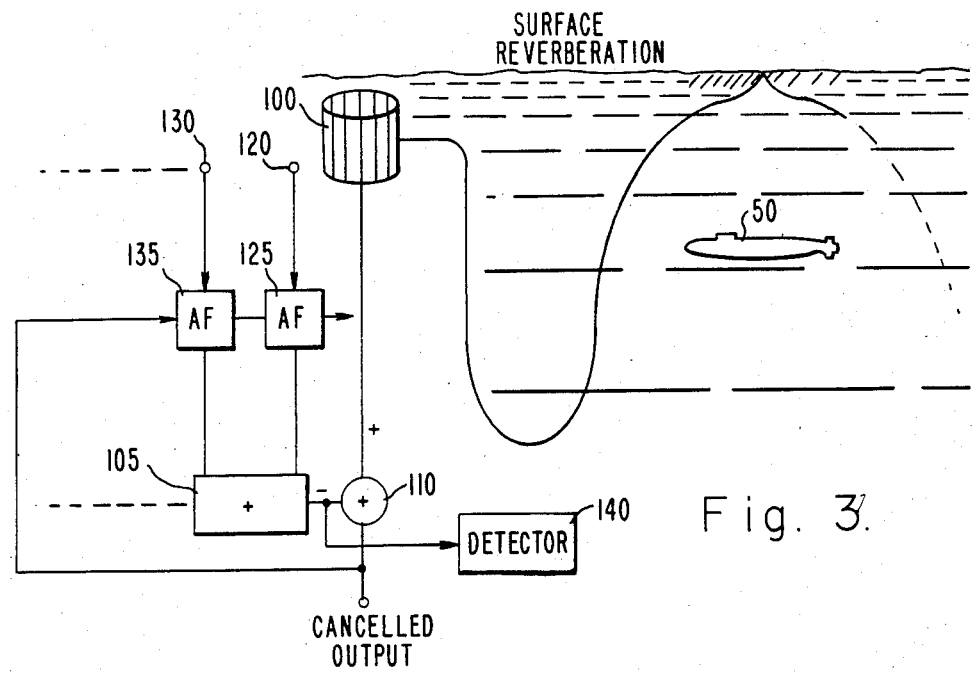
FIG. 3 is a block diagram of the preferred embodiment.

A sonar system employing a multiple canceller configuration is shown in block diagram form in FIG. 3. The system comprises a primary sensor 100, which in the preferred embodiment consists of an active hydrophone array. While the hydrophone array may be active, it is not necessary that the transmit array be disposed at the same location as the primary sensor array. For purposes of the invention, the sonar transmitter may be disposed at a different location than the primary receive sensor.

Reference sensors 120, 130, which comprise hydrophones in the preferred embodiment, are spatially separated from the primary sensor 100. In general, N reference hydrophones may be employed, although as discussed below, the preferred embodiment utilizes a single reference sensor.

The output of the reference sensors 120, 130 are respectively coupled to adaptive filters 125, 135. In the preferred embodiment, each filter employs a Least Mean Square ("LMS") algorithm. Such filters are well known to those skilled in the art, and have been extensively discussed in the literature, such as for example, "Final Report on the Cancellation of Surface Reverberation from a Bistatic Sonar," P. Feintuch, F. Reed, N. Bershad, Hughes Aircraft Company, Fullerton, Calif., FR81-11-1246, January 1982; "Time Delay Estimation Using the LMS Adaptive Filter," P. Feintuch, F. Reed, N. Berchad, *IEEE Transactions on Acoustics, Speech and Signal Processing*, Vol. ASSP-29, June 1981; "Adaptive Antenna Systems," B. Widrow, P. Mantey, L. Griffiths and B. Goode, *Proceedings of IEEE*, Vol. 55, December 1967; "Adaptive Noise Cancelling," B. Widrow et al., *Proceedings of IEEE*, Vol. 63, December 1975.

The outputs of the LMS adaptive filters 125, 135 are combined at summing device 105 to form a composite filter output, which composite signal is inverted and then summed with the output of the primary sensor at summer 110. The output of the summing device 110 comprises the cancelled sonar output. The cancelled output comprises an error signal which is in turn fed back to the adaptive filter to control the tap coefficient values, as is well known to those skilled in the art. The output of summing device 105 is also coupled to detector device 140. This process can also be implemented in the frequency domain as will subsequently be described in more detail with reference to FIG. 5.

In order to cancel a waveform, it must be correlated between the reference hydrophones and the primary sensor (usually a beam steered to the target). Thus, when the interest is in cancelling the extended interference, the reference hydrophones are clustered close to the primary. This preserves high correlation at the inputs to the canceller, allowing the canceller to respond to the strong interference, producing a spatial notch in its direction.

Although this correlation approach removes the interference, and allows detection of the signal if it is outside of the interference angle, it does not fully exploit the received information.

Since a solution to the signal detection problem cannot rely on separate energy arrival angles, it must use other statistical ways in which the signal and the interference differ. For detection rather than cancellation, one must operate in a region that exploits the difference between the statistics under the signal present and signal absent cases. The target signal remains spatially correlated at large sensor spacings, while the interference correlation decreases. The objective is therefore to operate at large rather than small spacings between the primary and reference sensors, for which the surface reverberation is decorrelated by the distance, while the signal correlation is preserved. The processor is then asked to respond to the correlated signal, when it appears, and to reject the essentially uncorrelated reverberation which is always present. Thus, the processor is predicting the signal correlation rather than cancelling on the interference.

The processor structure for this predictor operation is similar to the canceller structure except that the filter output is used for detection rather than the error output, and the reference sensors are spaced far from the primary sensor. Then, under normal conditions of surface reverberation in the absence of signal, very little correlation exists between the references and the primary, and the filter does not respond, i.e., on the average it passes nothing. The error, or cancelled, waveform is essentially the primary alone since there was no correlated energy to cancel, and the filter output is very small.

When the signal appears, it represents a correlated component between the references and the primary. The least mean square adaptive filter will try to pass this component so that it can remove it from the primary and thus reduce the power in the error waveform. It responds to the signal, causing the filter output to increase and thus allowing the signal to be detected.

The structure of signal detector 140 need not be described in detail, since detectors are well known to those skilled in the art. By way of example only, the filter output may be provided to a square law detector, in turn coupled to a threshold decision device.

It is noted that this is a direct analogy to the temporal predictor that can be used to detect a tone in broadband noise, called a "line enhancer." As with the line enhancer, there are implementation questions of convergence time, algorithm noise, steady-state response, and number of references.

Simulations were performed using a computer model of CZ reverberations as an extended source. These simulations indicated that substantial improvements in the detection probability were possible when the reference was placed such that the reverberation correlation between reference and primary outputs was small. A key simulation result was that, in all cases, use of more than one reference provided little improvement over a single reference and could even degrade performance via algorithm noise.

The single reference predictor structure was analyzed in both steady-state and transient cases by means of a frequency domain model, as is discussed in more detail below. The simulations appear to be in agreement with the analytical performance predictions.

The steady-state performance predictions provide an upper bound on the detection probability obtainable in a given situation (i.e., for a given CSD between sensors, signal-to-reverberation ratio, and adaptive time constant), as well as providing a good estimate of performance when sufficient signal samples exist for the filter to converge. The steady-state performance is always improved by reducing the value of the adaptive feed back coefficient $\mu$ (giving the filter a longer time constant). Assuming that the target is in the CZ for at least 12 pings, allowing ping-to-ping integration of 12 detector outputs, it was shown that reasonable steady-state detection probabilities can only be obtained if:

$$\mu P_I \leq \left(\frac{P_s}{P_I}\right)^2, P_{FA} = 10^{-3}, P_D = 0.5 \qquad (2)$$

where $P_I$ and $P_s$ are the interference and signal powers, respectively, in the Fast Fourier Transform bin containing signal. This is a considerably stronger condition on the adaptive filter time constant than the condition for stability, $$|\mu P_I| < 1 \qquad (3)$$

and will therefore require very long time constants for small signal-to-reverberation ratios. Since the number of samples of signal may be limited by the transmitted pulse length, it will be desirable to increase $\mu$ somewhat to obtain more rapid convergence, sacrificing some steady-state detection probability. However, the detection probability after n signal samples or at steady-state obtained by increasing $\mu$ from $\mu_1$ to $\mu_2$ will always be less than the steady-state detection probabilities associated with $\mu_1$. Using typical CZ scattering strengths and target strengths it appears that reasonable signal-to-reverberation ratios are on the order of 0 to $-15$ dB. The steady-state detection results show that useful performance gains can be obtained for signal-to-reverberation ratios in the range if Equation 2 is met and if the reference hydrophone can be placed so as to obtain normalized cross-spectral density:

$$\rho < 0.05 \qquad (4)$$

According to both exponential and sinx/x moduls for the CSD, such values for $\rho$ can be obtained for very practical spacings of the sensors. Use of distances between sensors of 20 to 100 feet were used to obtain such values of $\rho$ in the simulations.

Assuming a receiver bandwidth or about 300 Hz and a transmitted pulse length of 0.5 seconds, only on the order of 150 independent samples of the signal will be available. Under these circumstances it was shown (by analysis of the transient case) that choosing some relatively large value of $\mu$ may yield better detection probability after 150 samples, even though a smaller $\mu$ would give better steady-state detection. In fact, for a given number of samples, number of pings, value of $\rho$, and signal-to-reverberation ratio there is an optimum $\mu$ that can be found. Again, assuming 12 pngs, values of $\mu$ and $\rho$ meeting Equations 2 and 4, and a probability of false alarm, $P_{FA}=10^{-3}$, it was shown that useful detection probabilities can be obtained with 150 signal samples with signal-to-reverberation ratios on the order of 0 to $-10$ dB, but not with $-20$ dB.

As a consequence of these analyses, it appears that for signal, reverberation, and algorithm parameters consistent with modern active sonars operating in the CZ mode, the spatial prediction approach to detection of the plane wave signal will allow detection of targets not possible using conventional active processing provided the reference hydrophone can be placed to give $\rho<0.05$. The models employed in the analysis indicate that such values of $\rho$ can be obtained with very reasonable spacing between primary and reference, allowing the reference to be positioned, for example, along the hull aft of the primary array. The results of the simulations are discussed in summary form below, and are described in detail in "Final Report on the Surface Reverberation Investigation," P. Feintuch, F. Reed, N. Bershad and C. Flynn, FR 83-11-1412, Hughes Aircraft Company, Fullerton, Calif., dated July, 1983 under Government Contract No. N00024-82-C-6272.

Since the performance of the predictor will depend upon the actual correlation properties of the surface reverberation, other models of the reverberation noise have been investigated.

The far-field model of the surface reverberation assumed propagation via straight line paths, instead of the refracted paths along which the acoustic energy actually propagates. The reverberating surface was assumed to be an annular sector in the CZ annulus, with the width of the sector defined by the transmit beam width of the sonar. While this model produces an extended source representation, as the distance to the surface became much larger than the depth of the receiver, D, the vertical (or range) extend became negligible. Hence, when the reverberation was at endfire relative to a line through the primary and reference sensors, the model became a point source. In reality, however, the CZ arrivals will be distributed over some vertical angular region, so this vertical extent should be preserved in the model.

Figure 4:
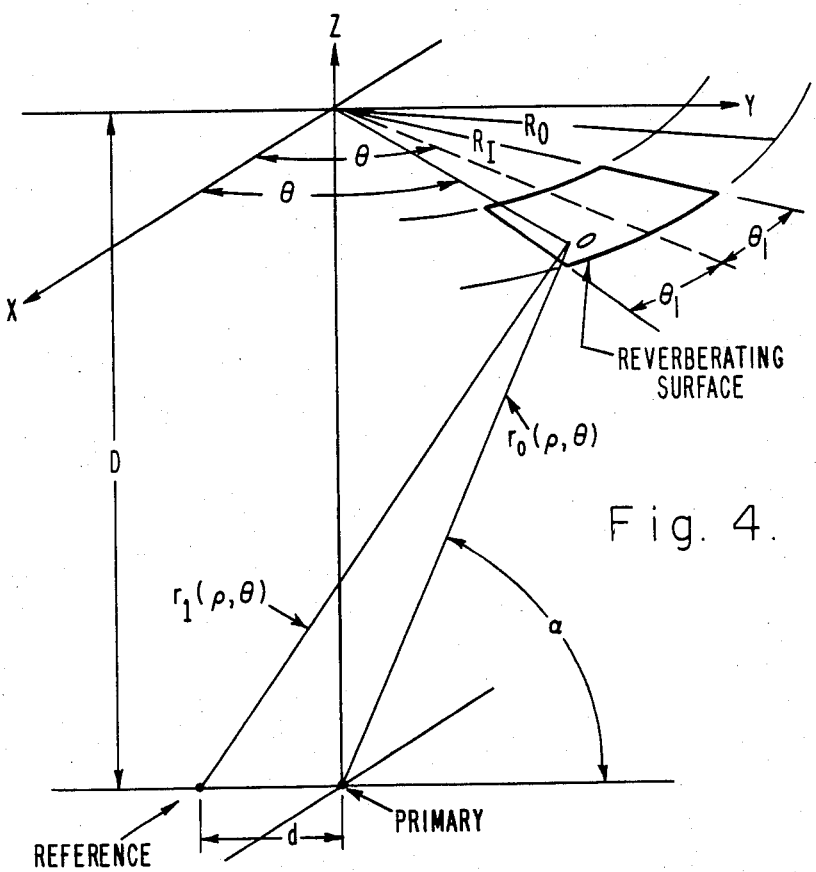
FIG. 4 is a chart illustrating the basic geometric relationships employed in a two dimensional model of the surface reverberation.

A two dimensional model of the surface reverberation was developed in which vertical extent is retained, and which utilizes the basic geometrical framework shown in FIG. 4, although energy arrivals from the CZ are not assumed to arrive via straight line paths, and the effects of propagation loss on the reflections from each point on the CZ are included. It was assumed that the reverberation is uniform in both horizontal and vertical angles, in order to allow development of closed form expressions for the hydrophone output statistics. Specifically, when the angular extents are narrow, the cross-spectral density, $s_e(d,\omega)$, between two sensors spaced d feet apart in the horizontal was determined to be approximately of the form given by Equation 5, comprising the product of the cross-spectral densities due to the vertical and horizontal extents of the reverberation.

$$s_e(d,\omega) \cong \sigma_n^2(\omega)\delta(d) + \sigma_r^2(\omega) \frac{\sin\left[\frac{\omega d}{c}\theta_1\cos\psi_o\sin\theta_o\right]}{\left[\frac{1}{2}\frac{\omega d}{c}\cos\psi_o\sin\theta_o\right]} \cdot \frac{\sin\left[\frac{\omega d}{c}\psi_1\sin\psi_o\cos\theta_o\right]}{\left[\frac{1}{2}\frac{\omega d}{c}\sin\psi_o\cos\theta_o\right]} e^{j\frac{\omega d}{c}\cos\theta_o\cos\psi_o} \quad (5)$$

where
$\omega$ = radian frequency
$\sigma_n^2(\omega)$ = ambient noise spectrum
$\sigma_r^2(\omega)$ = reverberation spectrum
$c$ = speed of sound
$2\theta_1$ = horizontal extent of CZ arrivals
$2\psi_1$ = vertical angular extent of CZ arrivals
$\psi_o$ = vertical angle at center of CZ
$\theta_o$ = horizontal angle at center of CZ
and $$\delta(d) = \begin{cases} 1, d = o \\ o, \text{otherwise} \end{cases}$$

As discussed above, the ability to detect the plane wave target in the presence of the CZ surface reverberation is based upon the difference between the target CSD and that of the reverberation. Specifically, the reverberation CSD rolls off as a function of the distance d between the primary and reference, while the target CSD does not. The model represented by Equation 5 retains its extent even at endfire ($\theta_o=o$), and thus is more realistic than the far-field model represented by the sin(x)/x CSD function. This narrow vertical extent will provide some basis for detection of a plane wave target. If the reverberation CSD can be made narrower in the parameter, d, then the correlation will be reduced between two sensors a fixed distance apart, which should improve the detection performance of the predictor (assuming all other parameters remained unchanged).

While the vertical extent of the CZ is fixed by the propagation conditions, Equation 5 shows that broadening the azimuth beamwidth of the transmitter actually narrows the reverberation CSD. However, as the azimuth beamwidth is increased, illuminating more of the CZ, the reverberation power increases. Thus, while increasing azimuth beamwidth would appear to improve detection from the point of view of narrowing the CSD, it also degrades detection by reducing the signal-to-reverberation ratio. This suggests there is a trade-off in the selection of azimuth beamwidth using the predictor approach that is not a consideration in conventional sonars.

The performance of the spatial predictor will depend strongly upon the spatial correlation that actually occurs for the CZ reverberation. The two dimensional model makes very specific assumptions leading to Equation 5. The actual reverberation CSD may not have the detailed form of Equation 5, although it is anticipated that it will roll off as d is increased. A more general form of the spatial CSD, $s_e(d,\omega)$, has been developed and is set forth as Equation 6:

$$s_c(d,\omega) = \sigma_n^2(\omega)\delta(d) + \sigma_r^2(\omega)\rho_V(d,\omega)\rho_H(d,\omega) \tag{6}$$

with $\rho_V(d,\omega)$ and $\rho_H(d,\omega)$ the normalized CSD's due to the horizontal and vertical extents of the CZ.

An alternative functional form for the horizontal and vertical components of the hydrophone output CSD is the double exponential form set forth in Equation 7:

$$\rho(d,\omega_k) = e^{-B|d|} \tag{7}$$

where B is a parameter that controls the width of the CSD, and is thus inversely proportional to the extent of the reverberating surface. The reverberation represented by Equation 7 is not truly angle limited, but rolls off slowly beyond some angular distance from the center of the arrivals.

In reality, transmit beam patterns will roll off slowly and the vertical extent of the CZ may not be as sharply defined as was assumed in the development of the sin(x)/x CSD. Therefore, Equation 7 provides a means of considering the predictor behavior when the reverberation is not ideally angle limited. In addition, the exponential CSD has some very desirable analytical properties, the most important being that the reference hydrophone CSD matrix associated with Equation 7 is invertible in closed form.

DETECTION PERFORMANCE FOR AN ARBITRARY CSD WITH A SINGLE REFERENCE

Specific forms of the spatial cross-spectral density produced by the CZ reverberation were considered above. However, actual test data to validate any specific spatial CSD is not currently available. As a result, analytical determinations of the detection performance of the predictor structure for CZ reverberation exhibiting arbitrary cross-spatial density between the reference and primary sensors have been performed. The analysis provides a useful characterization of the predictor behavior regardless of the reverberation CSD occurring in practice.

These results include the predictor performance in steady-state, that is, when sufficient signal samples are available to allow the adaptive filter to reach steady-state. In this application, however, the number of signal samples may be limited (for example, by the pulse length).

The results also include the development of the transient response of the adaptive predictor to evaluate the detection probability as a function of the number of samples available, as well as of the filter parameters.

The analytic results show that use of more than one reference hydrophone with a narrow, extended interference provides at best only slight improvement in detection over a predictor using a single reference. In fact, use of additional references may actually degrade performance by adding enough filter algorithm noise to offset any small gains resulting from use of another reference.

Use of one reference not only simplifies the processing required to implement the adaptive predictor, it allows analysis of the predictor for arbitrary CSD in closed form. This analysis uses a frequency domain implementation, illustrated in block diagram form in FIG. 5, of the adaptive filter in which both the primary and reference outputs are Fast Fourier Transformed (hereinafter also referred to as "FFT") prior to adaptive filtering.

Figure 5:
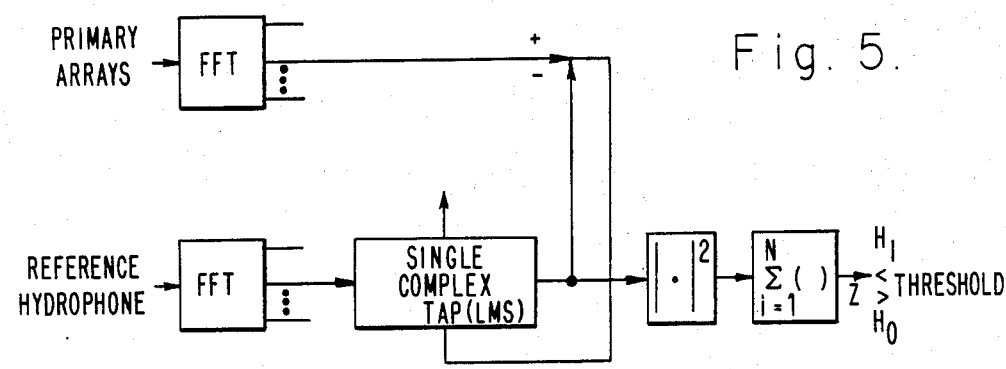
FIG. 5 is a block diagram illustrating frequency domain implementation of the predictor structure.

As shown in FIG. 5, each input is decomposed into frequency lines, using a discrete Fourier transform such as the FFT, and then on each bin the same cancellation structure as in FIG. 3 is performed. The adaptive filter reduces in this case to a Single Complex Tap which is updated with the complex LMS algorithm. The error outputs are used in the LMS algorithm for their associated frequencies. This decoupling of the feedback errors makes the algorithm significantly more efficient to implement in digital hardware.

More specifically, the output in each FFT bin is processed by a Single Complex Tap adaptive predictor. The statistics of the single tap adaptive filter output can be determined using the method described in "Analysis of the Frequency Domain Adaptive Filter," *Proc. IEEE*, Vol. 67, pp. 1658–1659, December 1979, taking advantage of the fact that the CSD of the reference is scalar. The detection is then made in the FFT bin containing the signal by means of a square law detector, as shown. The analyses described here are in terms of the signal-to-reverberation and signal-to-noise ratios in the FFT bin containing the signal.

The plane wave signal is assumed to appear in the $k^{th}$ FFT bin, centered at frequency $\omega_k$, with power, $P_{sk}$, and with a delay between primary and reference sensors of $\tau_s$ seconds. The reverberation is assumed to have power, $P_{IK}$, in the FFT bin containing the signal, with a normalized CSD between the primary and reference outputs of $\rho(d,\omega_k)\exp(j\omega_k\tau_I)$. Here $\rho(d,\omega_k)$ is real, so that the phase is that associated with a delay of $\tau_I$ between sensors.

The evaluation of detection performance is based upon the assumption that a sufficient number N of samples of the magnitude of the filter output are averaged to make the detection statistics, Z, approximately gaussian. The sonar receiver operating characteristic (hereinafter also referred to as "ROC") curves are then given by Equation 8:

$$P_D = \text{erfc}\left[\frac{\text{erfc}^{-1}(P_{FA}) - \sqrt{N}\,D}{\sqrt{V_1/V_o}}\right] \tag{8}$$

where $$\text{erfc} = \frac{1}{\sqrt{2\pi}} \int_x^\infty e^{-t^2/2}\,dt \tag{9}$$

$$D = \frac{E[Z|H_1] - E[Z|H_o]}{\sqrt{V_o}} \tag{10}$$

and where
$P_D$ = probability of detection
$P_{FA}$ = probability of false alarm
$V_1$ = variance of detection statistic, Z, under $H_1$
$V_o$ = variance of detection statistic, Z, under $H_o$
Here, $H_o$ and $H_1$ are the hypotheses that the signal is absent and present, respectively.

STEADY-STATE DETECTION WITH ARBITRARY CSD

Using the method outlined above and the results of the paper cited above, "Analysis of the Frequency Domain Adaptive Filter," the statistics of the adaptive filter output necessary to compute the detection performance using Equation 8 were derived. As shown in FIG. 5, the detection is based upon the square of the magnitude of the filter output.

The adaptive predictor is assumed to have converged in the reverberation plus noise environment (hypothesis $H_o$) when the signal appears. Steady-state detection performance means that the signal is present long enough for the filter to converge to a new (signal plus noise) solution before the threshold test is applied. If the filter does not fully converge, the detection performance will be degraded relative to the steady-state predictions. Therefore, the performance evaluations are an upper bound to the performance achieved in practice, as well as reasonable estimates of performance when sufficient signal samples are availabe. Further, the analysis has produced certain closed form expressions that are useful in identifying conditions on algorithm parameters that must be met if satisfactory detection performance is to be obtained.

It has been shown that if, in the $k^{th}$ FFT bin, $$P_{Ik} >> \frac{2|P_{sk}e^{j\omega k\tau s} + \rho(d,\omega_k)P_{Ik}e^{j\omega k\tau I}|^2}{P_{Ik}^2} \quad (11)$$

then the deflection of the predictor output is given by Equation 12.

$$D \simeq 1.155 \frac{P_{sk}}{P_{IK}} \quad (12)$$

Since the deflection obtained using the primary output only is ($P_{sk}/P_{IK}$), Equation 12 indicates that little detection improvement is obtained if $P_{IK}$ follows the relationship of Equation 11. On the other hand, if:

$$P_{Ik} << \frac{2|P_{sk}e^{j\omega k\tau s} + \rho(d,\omega_k)P_{Ik}e^{j\omega k\tau I}|^2}{P_{Ik}^2} \quad (13)$$

then the ROC is shown to be approximately given by Equation 14.

$$P_D \simeq erfc\left[\frac{erfc^{-1}(P_{FA}) - \sqrt{N}\, D}{|1 + D|}\right] \quad (14)$$

with $$D \simeq \frac{(P_{sk}/P_{Ik})^2}{\lambda} + 2\rho(d,\omega_k)\frac{(P_{sk}/P_{Ik})}{\lambda}\cos[\omega_k(\tau_I - \tau_s)] \quad (15)$$

$$\lambda = [\rho^4(d,\omega_k) + 3\rho^2(d,\omega_k)(\mu P_{Ik}) + \tfrac{3}{4}(\mu P_{Ik})^2]^{\tfrac{1}{2}} \quad (16)$$

Numerical evaluation of Equation 15 indicates that substantial improvements in detection performance are possible when Equation 13 is true if $\rho(d,\omega_k)$ can be made sufficiently small (by placing the reference sufficiently far from the primary). Note that when $\rho(d,\omega_k)$ becomes small, the condition given by Equation 13 becomes approximately:

$$\mu P_{Ik} << \left(\frac{P_{sk}}{P_{Ik}}\right)^2 \quad (17)$$

Figure 6:
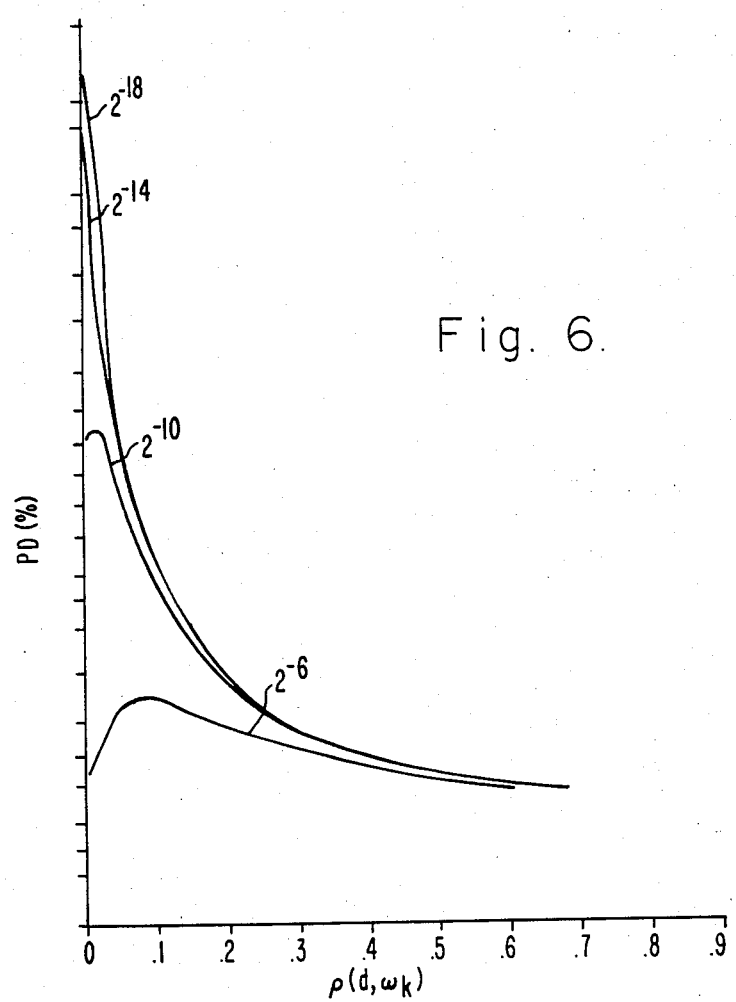
FIG. 6 is a graph plotting the probability of detection as a function of reverberation cross-spectral density for several filter time constants.

For intermediate values of $P_{Ik}$ in the area between the relationships of Equation 11 and Equation 13, the performance can be evaluated on the computer using closed form expressions. FIG. 6 shows the probability of detection, $P_D$, evaluated as a function of $\rho(d,\omega_k)$ for a false alarm probability of $P_{FA}=10^{-3}$ and for four values of $\mu P_{Ik}$, $2^{-6}$, $2^{-10}$, $2^{-14}$, and $2^{-28}$. It is assumed that $N=12$, i.e., 12 samples of the magnitude squared filter output are averaged to obtain the detection statistic. The signal-to-reverberation ratio is set at $-16$ dB at the primary output, so no reliable detection would be possible without use of the predictor structure.

The curves for $\mu P_{Ik}=(2^{-14}$ and $2^{-18})$ satisfy the condition, Equation 13, and therefore indicate reasonable detection performance ($P_D>0.5$) if $\rho(d,\omega_k)$ is on the order of 0.07 or smaller. When $\mu P_{Ik}=2^{-6}$, Equation 11 is true, so no satisfactory detection performance cannot be obtained for any $\rho(d,\omega_k)$. The value $\rho(d,\omega_k)=2^{-10}$ falls between Equation 11 and Equation 13, and yields detection probability of $P_D>0.5$ if $\rho(d,\omega_k)<0.05$. The numerical results, coupled with the analysis discussed above show that a sufficient condition for reasonable detection (e.g., with $P_D>0.5$) is given by Equation 18:

$$\mu P_{Ik} < \left(\frac{P_{sk}}{P_{Ik}}\right)^2 \quad (18)$$

The relationship of Equation 18 is a much stronger condition than the usual stability condition on $\mu$, that is, $|\mu P_{Ik}|<1$.

An interesting aspect of FIG. 6 is that the detection probability is not monotonic in $\rho(d,\omega_k)$ for the larger values of $P_{Ik}$. There is some value of $\rho(d,\omega_k)>0$ that produces the best $P_D$ for a given signal-to-reverberation ratio. This occurs because for small values of the CSD, $\rho(d,\omega_k)$, the mean of the magnitude square of the filter output continues to roll off as $\rho(d,\omega_k)$ is reduced, but the variance is held constant by the algorithm noise, thus reducing the deflection, given by Equation 15. However, when $P_{IK}$ is sufficiently small to allow satisfactory detection, the optimum value of $\rho(d,\omega_k)$ is so near zero that its presence can be neglected and the smallest value of $\rho(d,\omega_k)$ that is practical selected.

TRANSIENT RESPONSE AND ITS EFFECT ON DETECTION PERFORMANCE

The steady-state detection performance analysis was based upon the assumption that the algorithm step size $\mu$ was selected to be sufficiently large so that the predictor weight converged to a steady-state value with fixed statistics. However, there is some advantage to selecting a somewhat smaller $\mu$ so that the weight has not converged at the end of the observation interval, as there exists a trade-off between the mean weight response and the fluctuations in the weight response as $\mu$ varies. A smaller value of $\mu$ reduces both the transient mean weight value and the transient variance of the weight, resulting in a best choice for $\mu$ (largest detection probability) for a given number of algorithm iterations.

Expressions were derived for the transient first and second moments of the weights as a function of the number of algorithm iterations and the various system parameter values. The initial values of the two weight moments are determined by the steady-state weight behavior under the null hypothesis $H_o$ (reverberation and noise present). The transient behavior of the weight statistics are then evaluated under H₁ hypothesis (plane wave signal, reverberation and noise present).

The effect of the time-varying weight statistics upon the adaptive predictor output power test statistic has been evaluated. Explicit expressions have been derived for the detection probability as a function of the number of algorithm iterations per ping. As expected, the behavior of the weights with $\mu$ impacts on the detection performance of the power detector at the predictor output. A significant growth in detection performance occurs as a function of the number of adaptations n for small $\mu$, but after some point increasing n does not affect the performance significantly. This is because, as the weight converges, the detection performance becomes limited by the selection of the parameter (algorithm weight fluctuations).

Figure 7:
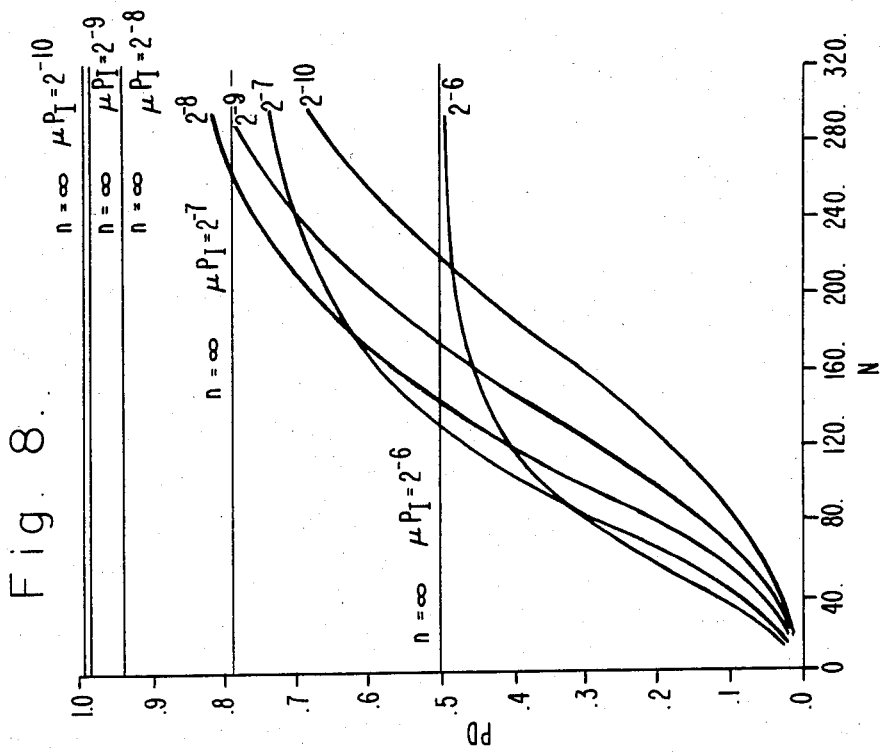
FIGS. 7-9 are graphs illustrative of the results of computer simulations of the predictor performance, which display the transient and steady-state probability of detection as a function of LMS algorithm iterations for various values of reverberation cross-spectral density and power.
Figure 8:
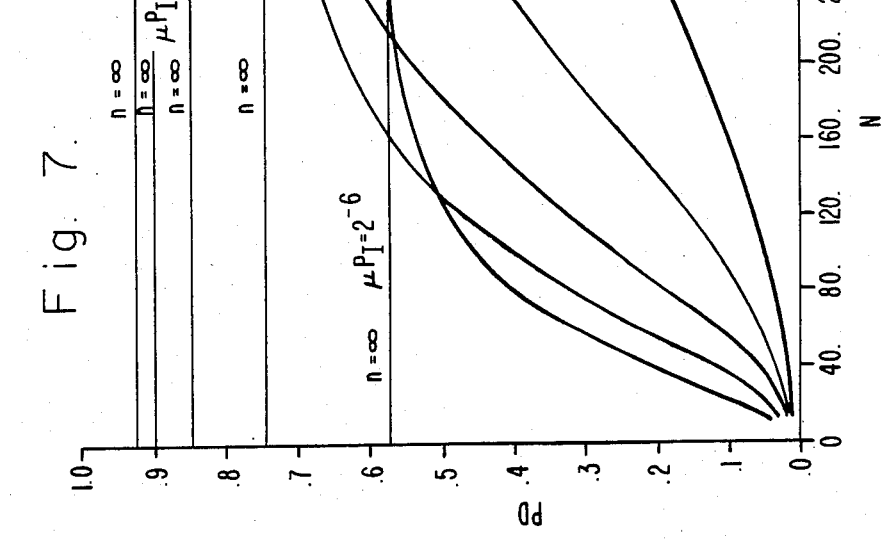
Figure 9:
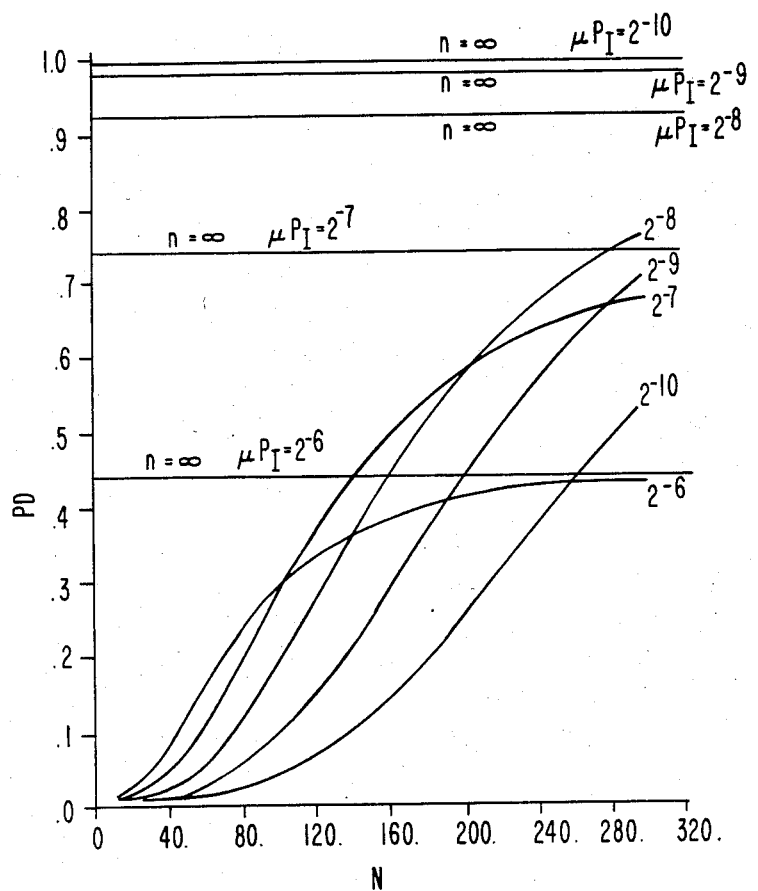

Table I shows the selection of the optimum value of the $\mu P_I$ product which gives the best detection for 150 samples per ping, $P_{FA}=10^{-3}$ and various values of $\rho$ (the reverberation correlation coefficient). FIGS. 7–9 are graphs which display the transient and steady-state probability of detection $P_D$ as a function of LMS algorithm iterations n for various values of cross-spectral density $\rho$ and interference power $P_I$. The steady-state detection probabilities (n=infinity) are shown as horizontal lines, i.e., constant $P_D$ for five values of cross-spectral density and $P_I$.

Comparison of Table I and the curves in FIGS. 7–9 shows that a relatively broad maximum of $P_D$ occurs as one varies $P_I$. Hence, a $P_I$ selection is moderately insensitive to the exact system parameters. However, significant detection improvement can be obtained by not selecting a $\mu P_I$ product to yield convergence at the end of the observation interval. For example, for $\rho=0.1$ and $\mu P_I=2^{-8}$, steady-state detection $P_D$ is 0.85, derived for the detection probability as a function of if the adaptive predictor only processes 300 samples per pulse, $\mu P_I=2^{-8}$ yields a $P_D$ of 0.68, whereas $\mu P_I=2^{-6}$ yields a $P_D$ of only 0.52.

TABLE I

PROBABILITY OF DETECTION VS. USING OPTIMUM $P_I$
($P_{FA} = 10^{-3}$, no. of pings = 12, no. of iterations per ping = 150)

| $P_s/P_I$ | $\rho$ | Optimum $P_I$ | Deflection | $P_D$ |
|---|---|---|---|---|
| $10^{-1}$ | .001 | $2^{-7.1}$ | .84 | .49 |
| $10^{-1}$ | .01 | $2^{-7.2}$ | 1.0 | .56 |
| $10^{-1}$ | .1 | $2^{-6.6}$ | .98 | .55 |
| $10^{-1}$ | .2 | $2^{-6.2}$ | .67 | .33 |
| $10^{-2}$ | .001 | $2^{-6.9}$ | .02 | .0018 |
| $10^{-2}$ | .01 | $2^{-8.}$ | .04 | .0029 |
| $10^{-2}$ | .1 | $2^{-6.7}$ | .075 | .0049 |
| $10^{-2}$ | .2 | $2^{-6.1}$ | .058 | .0034 |

From Table I, it can be seen that for $P_s/P_I=10^{-1}$ and widely varying values of $\rho$, there exists a $\mu P_I$ selection which yields a satisfactory detection probability. This result does not hold for $P_s/P_I=10^{-2}$.

SUMMARY OF SIMULATION RESULTS

The construction of an extended source and the processing using a multiple predictor structure (shown in FIG. 3) were simulated in detail.

The simulations computed detected probability, $P_D$, for a fixed false alarm probability, $P_{FA}$. The situation consisted of a null hypothesis, $H_o$, (for which only reverberation and noise are present) and an whereas for $\mu P_I=2^{-6}$, steady-state $P_D$ is 0.57. However, alternative hypothesis, $H_1$, (for which signal is present in addition). The filters converge under $H_o$, and statistics are computed. Then the signal is inserted to represent the target return and the statistics under $H_1$ are computed. These are then converted to $P_D$ for fixed $P_{FA}$. The performance is computed as a function of time, so that both transient and steady-state results are available.

The simulations indicate the following properties:

a. The use of more than a single reference leads to a minimal improvement in detection performance and may actually degrade performance due to increased algorithm noise.

b. Detection performance tends to increase with increasing separation distance between the primary and the reference hydrophone.

c. As the extended source approaches endfire, detection performance of the adaptive predictor degrades, and the extended source appears more like a point source.

d. The predictor can offer significant performance improvements if the reference is properly placed and the adaptive filter parameters are properly selected.

Figure 10:
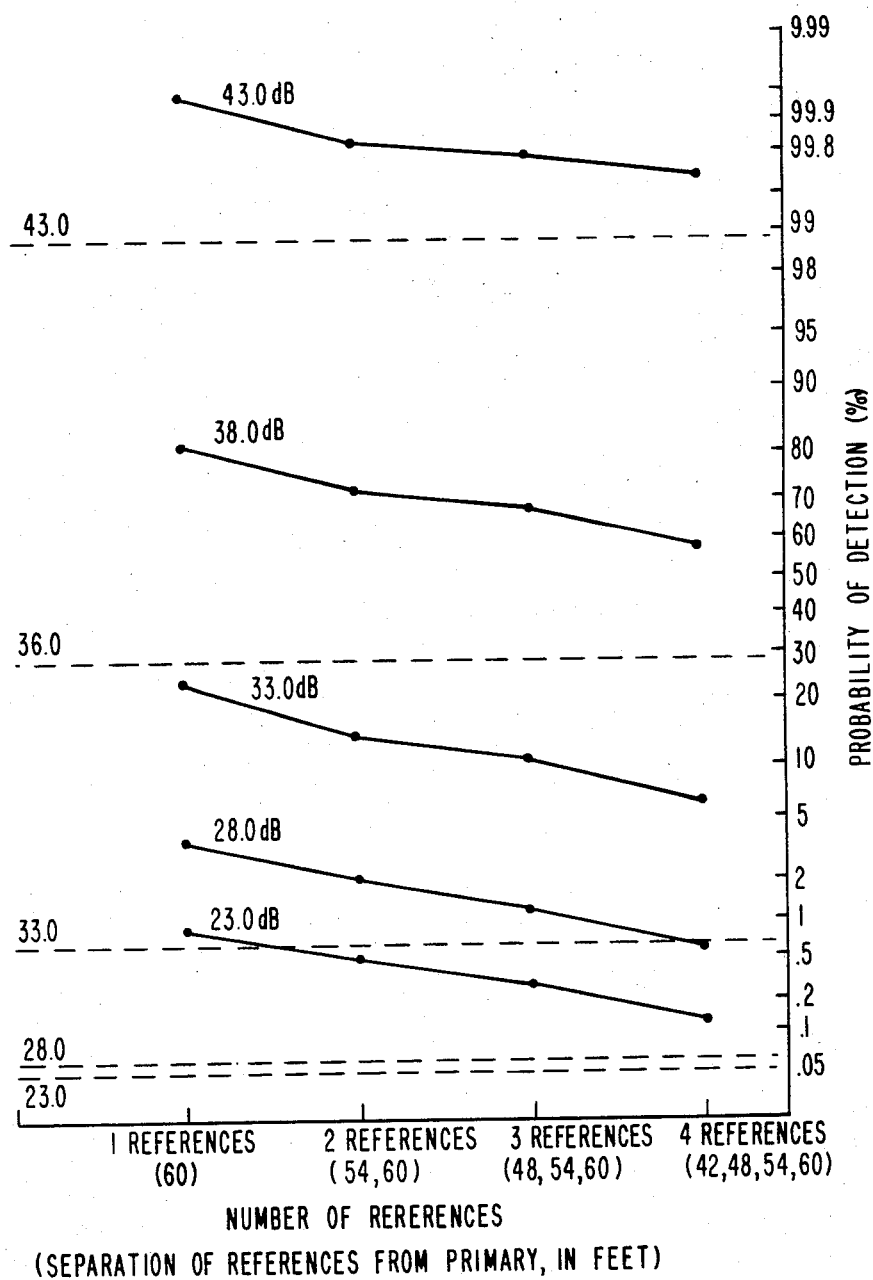
FIG. 10 is a graph plotting the probability of detection as function of the number of reference sensors.

FIG. 10 demonstrates conclusion (a), in that as more references were used for prediction, performance consistently degraded for the same value of target SNR. In many cases, the performance of the predictor structure using a set of multiple references is significantly worse than the performance of the predictor using any single one of the same set of references. This is due to the additional algorithm noise present in the multiple adaptive predictor network.

Figure 11:
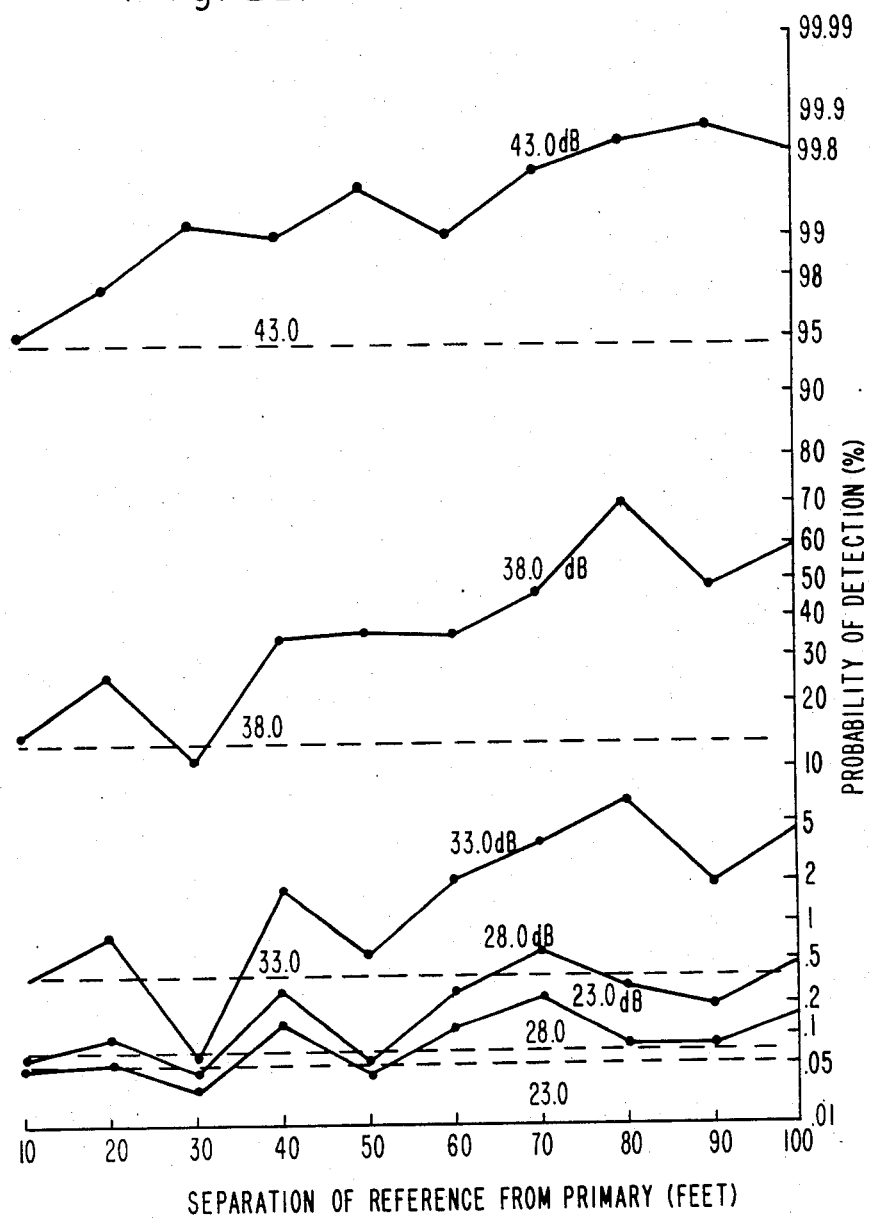
FIG. 11 is a graph plotting the probability of detection as a function of the separation of the reference sensor from the primary sensor.

FIG. 11 demonstrates conclusion (b). The detection probability shows an increasing trend as the separation between the primary and the reference is increased. This occurs because of the CSD properties of the narrowband point source target and the extended interference. For the point source target, the cross-spectral density is a constant value which does not change with increasing separation, while for the extended source the cross-spectral density tends to decrease with increasing separation. Since the predictor operates by adapting to correlation between the primary and reference channels, it follows that its target detection performance will be best when the correlation due to the extended interference has the smallest magnitude. This occurs for large separations between the primary and the reference or at those separations for which the sin(x)/x cross-spectral density function of the extended source is passing through a null.

The fact that the cross-spectral density of the extended source is a sin(x)/x function also explains why the detection performance of the predictor does not monotonically increase with separation. The increases and decreases in detection performance present in FIG. 7 are caused as the reference for the predictor moves successively through nulls and peaks in the CSD function with increasing separation. Since large hydrophone separations are sometimes difficult to achieve in practice, if it were possible to know a priori the location and angular extent of the extended interference and the frequency of the target, then a smaller hydrophone spacing could be chosen which corresponds to the first null in the CSD. The difficulty is that this smaller separation is only optimal for this particular set of conditions, while a large separation offers better average performance under all conditions.

The sin(x)/x function nature of the CSD of the extended interference also explains why the performance of the predictor degrades for sources near endfire. As the extended source approaches endfire, its effective angular extent decreases. This causes a broadening of its CSD which means that extremely large separations are required between the primary and the reference to obtain satisfactory performance.

By comparing the detection probabilities for a given SNR target without the predictor to those giving similar detection probabilities for a small SNR target with the predictor, an indication of the performance improvement of the predictor can be obtained. From the performance plots it can be seen that the performance improvement of the predictor is almost always greater than 10 dB. This significant improvement is obtained when the separation between the primary and the reference is at least as great as the distance required to reach the first null in the cross-spectral density of the extended interference source.

It is understood that the above-described embodiments are merely illustrative of the many possible specific embodiments which can represent principles of the present invention. Numerous and varied other arrangements can be readily devised in accordance with these principles by those skilled in the art without departing from the spirit and scope of the invention.

What is claimed is:

1. An active sonar system adapted to detect a target in a sonar convergence zone in the presence of surface reverberation, comprising:
   primary transducer means for receiving acoustic energy and providing primary transducer signals;
   reference transducer means for receiving acoustic energy and providing reference transducer signals, said reference transducer means spatially separated from said primary transducer means by a sufficient distance that surface reverberation components of the primary and reference transducer signals are substantially uncorrelated; and
   sonar processor responsive to said primary and reference transducer signals to detect a target in said sonar convergence zone in the presence of surface reverberation, said processor comprising means responsive only to correlated components of said primary and reference transducer signals to provide a "target present" indication only when the signal power in said correlated components of said reference signal exceeds a predetermined threshold.

2. The sonar system of claim 1 wherein said means responsive only to correlated components of said primary and reference transducer signals comprises:
   an adaptive filter means adapted to filter said reference transducer signals and provide filtered reference transducer signals signals;
   means adapted to combine the filtered reference transducer signals and primary transducer signals, and provide an error signal for adaptive adjustment of said adaptive filter means; and
   detector means responsive to said filtered reference transducer signals for providing a signal indicative of the "target present" condition when said filtered signals represent signal power exceeding a predetermined threshold.

3. The sonar system of claim 2 wherein said adaptive filter means is adapted to employ a Least Mean Square (LMS) algorithm to adaptively determinate the filter coefficients.

4. The sonar system of claim 1 wherein said primary and reference transducers are separated by a sufficient distance that the normalized cross-spectraldensity between the surface reverberation components received at said respective primary and reference sensors is less than 0.05.

5. The sonar system of claim 1 wherein said reference transducer comprises a hydrophone device.

6. The sonar system of claim 5 wherein said primary transducer means comprises an array of hydrophone devices adapted to provide a directional beam.

7. A sonar system for detecting a target in the presence of extended source interference, comprising:
   primary sensor means for receiving acoustic energy and providing a primary sonar signal comprising a first target component and a first extended source interference component;
   reference sensor means for receiving acoustic energy and providing a reference sonar signal comprising a second target component and a second extended source component, said primary and reference transducers spatially separated by a sufficient distance that said first and second extended source interference components are substantially uncorrelated; and
   means responsive to said primary and reference signals for providing a "target present" indication only when correlated acoustic energy components exceeding a threshold are received at said primary and reference sensors.

8. The sonar system of claim 7 wherein said primary sensor comprises a directional array of hydrophones for providing a beam steered to a predetermined direction, and said means for providing a "target present" indication is operable when the target and the extended source are each disposed within said beam.

9. The sonar system of claim 7 wherein said means responsive to said primary and reference signals comprises:
   means for adaptively filtering said reference sonar signals and providing filter output signals;
   means for inverting said filter output signals and summing said inverted signals with said primary sonar signals to provide a resultant error signal employed to adaptively adjust said adaptive filter means; and
   means responsive to said filter output signals for providing a "target present" signal only when said filter output signals represent signal power exceeding a predetermined threshold.

10. The sonar system of claim 9 wherein said adaptive filter means employs a Least Means Square (LMS) algorithm to adapt the filter.

11. The sonar system of claim 10 wherein said reference sensor means comprises a hydrophone sensor disposed a distance d from the primary sensor.

12. The sonar system of claim 11 wherein said distance d is large enough such that the normalized cross-spectral density of surface reverberation signals received at said primary and reference sensors is less than 0.05.

13. The sonar system of claim 9 wherein said reference sensor means comprises N sensors spaced from said primary sensor, and wherein said means for adaptively filtering said reference sonar signals comprises N adaptive filter means each coupled to a corresponding one of said reference sensors to filter the respective reference sonar signal generated by the respective reference sensor.

* * * * *